United States Patent
Kruglick

(10) Patent No.: US 9,077,771 B2
(45) Date of Patent: Jul. 7, 2015

(54) ENABLING LOCATION-BASED APPLICATIONS TO WORK WITH IMAGINARY LOCATIONS

(75) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 116 days.

(21) Appl. No.: 13/640,046

(22) PCT Filed: Mar. 29, 2012

(86) PCT No.: PCT/US2012/031304
§ 371 (c)(1),
(2), (4) Date: Oct. 9, 2012

(87) PCT Pub. No.: WO2013/147815
PCT Pub. Date: Oct. 3, 2013

(65) Prior Publication Data
US 2013/0260846 A1 Oct. 3, 2013

(51) Int. Cl.
*A63F 9/24* (2006.01)
*H04L 29/06* (2006.01)

(52) U.S. Cl.
CPC ................................. *H04L 67/38* (2013.01)

(58) Field of Classification Search
USPC .............................................. 463/31–33, 42
IPC .......................................................... A63F 13/10
See application file for complete search history.

(56) References Cited

U.S. PATENT DOCUMENTS

2002/0187831 A1  12/2002  Arikawa et al.
2005/0202862 A1*  9/2005  Shuman et al. .................. 463/9
2010/0030804 A1*  2/2010  Behrends et al. ......... 707/103 R
2010/0279776 A1  11/2010  Hall
2011/0269540 A1  11/2011  Gillo et al.

OTHER PUBLICATIONS

International Search Report and Written Opinion for PCT/US12/31304 Filed on Mar. 29, 2012, Mailed on Jun. 27, 2012.
Schrier, "Nanoporous graphene", file:///Z:/2817%20INTELLECTUAL%20VENTURES/0041USWO%20US-814746-02-US . . . Sep. 30, 2012.
Location Spoofer, AppBrain 2010-2012, http://www.appbrain.com/app/location-spoofer/org.ajeje.fakelocation.

(Continued)

*Primary Examiner* — Omkar Deodhar
(74) *Attorney, Agent, or Firm* — Turk IP Law, LLC

(57) ABSTRACT

Technologies for game providers to place their game worlds into existing map databases and communicate the relevant locations to location-based applications are generally described. In some examples, this may be achieved by generating maps that use non-physical locations that are still within standard location data formats at a game service provider and providing the maps and/or map data to map server providers showing game worlds mapped to those coordinates. Alternatively, the game service provider may provide the map data to the map service provider and the map may be generated at the map service provider. The imaginary location maps may be identified by extreme or non-physical altitudes, for example. Game clients may be enabled to publish the location of their game persona on an imaginary map and/or their real persona on a real map and receive location-based services for either or both personas.

20 Claims, 7 Drawing Sheets

(56) References Cited

OTHER PUBLICATIONS

Zax, Apple Charts a Course for 3-D Maps, Technology Review, Published by MIT, Nov. 3, 2011, http://www.technologyreview.com/blog/helloworld/27312/?ref=rss.

Single-precision Floating-point format, file:///Z:/2817%20INTELLECTUAL%20VENTURES/0074USWO%20US-820339-02-US . . . Sep. 28, 2012.

Google Maps API Web Services, http://code.google.com/apis/maps/documentation/geocoding/, Sep. 28, 2012.

Maninen, New generation of location games catches on, VentureBeat—News About Tech, Money and Innovation, May 7, 2010.

Four New Patents Issued to TeleCommunications Systems Fills Holes in LBS Apps (http://apb.directionsmag.com/entry/four-new-patents-issued to-telecommunications-systems-fills-holes-in-I/184068), Directions Magazine, Jun. 15, 2011.

Fictional Universe, Wikipedia, This page was last modified on Dec. 17, 2011 at http://en.wikipedia.org/wiki/Fictional_universe.

International Preliminary Report on Patentability for PCT/US2012/031304 filed Mar. 29, 2012, mailed on Oct. 9, 2014, issued Oct. 1, 2014.

* cited by examiner

ENABLING LOCATION-BASED APPLICATIONS TO WORK WITH IMAGINARY LOCATIONS

BACKGROUND

This Application is the National Stage filing under 35 U.S.C. § 371 of PCT Application Ser. No. PCT/US12/31304 filed on Mar. 29, 2012. The disclosure of the PCT Application is hereby incorporated by reference in its entirety.

Location-based applications are put to many social and tagging uses. Many computing devices have application programming interface (API)—level access that can allow a user to "check-in" and post location, links and content of interest or photos to various location-based services. Many mobile operating systems also allow a program to advertise itself so that users can post to them from other content or programs. For example, a summary feed reader on some smartphones can post any web page or article directly to a social networking application, an online note-taking application, or other applications with just an API call.

Such APIs allow both location and content to be posted to services, with location data being managed based on standards such as World Wide Web Consortium (W3C) standards compliant location data. A game can post content through such a channel simply by invoking the sharing API and providing extensible markup language (XML) content, but so far game providers cannot provide meaningful location based data that would allow players to use familiar social networking applications and programs to spot nearby friends or show people where they are in the imaginary world of a game.

SUMMARY

The present disclosure generally describes techniques for enabling location-based applications to work with imaginary locations. In some examples, a method for providing a map service that enables location-based applications to work with imaginary locations is described. An example method may include receiving map data including coordinate information, determining the map data as belonging to an imaginary location based on the coordinate information, generating a map based on the map data, and providing the map for the imaginary location through the map service.

In other examples, a map service provider enabling location-based applications to work with imaginary locations is described. The map service provider may include one or more servers configured to receive map data from a game provider including coordinate information, determine, the map data as belonging to an imaginary location based on the coordinate information, generate a map based on the map data, and provide the map for the imaginary location through a map service.

In further examples, a method for enabling location-based applications to work with imaginary locations associated with a game is described. The method may include generating map data for an imaginary location including coordinate information, indicating the map data as belonging to the imaginary location, and providing the map data to a map service to generate a map for the imaginary location based on the map data.

In other examples, a game provider service enabling location-based applications to work with imaginary locations associated with a game is described. The game provider service may include one or more servers configured to generate map data for an imaginary location including coordinate information, indicate the map data as belonging to the imaginary location, and provide the map data to a map service to generate a map for the imaginary location based on the map data.

In yet other examples, a method for participating in an online game with location-based applications enabled to work with imaginary locations associated with the game is described. The method may include joining the game using a game persona, enabling publication of game persona location within an imaginary map of the game, and receiving one or more location-based services based on the game persona location on the imaginary game map.

In further examples, a computing device executing a game client for participating in an online game with location-based applications enabled to work with imaginary locations associated with the game is described. The computing device may include a memory configured to store instructions and a processor configured to execute the game client in conjunction with the instructions stored in the memory. The game client may be configured to join the game using a game persona, enable publication of game persona location within an imaginary map of the game, and receive one or more location-based services based on the game persona location on the imaginary game map.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
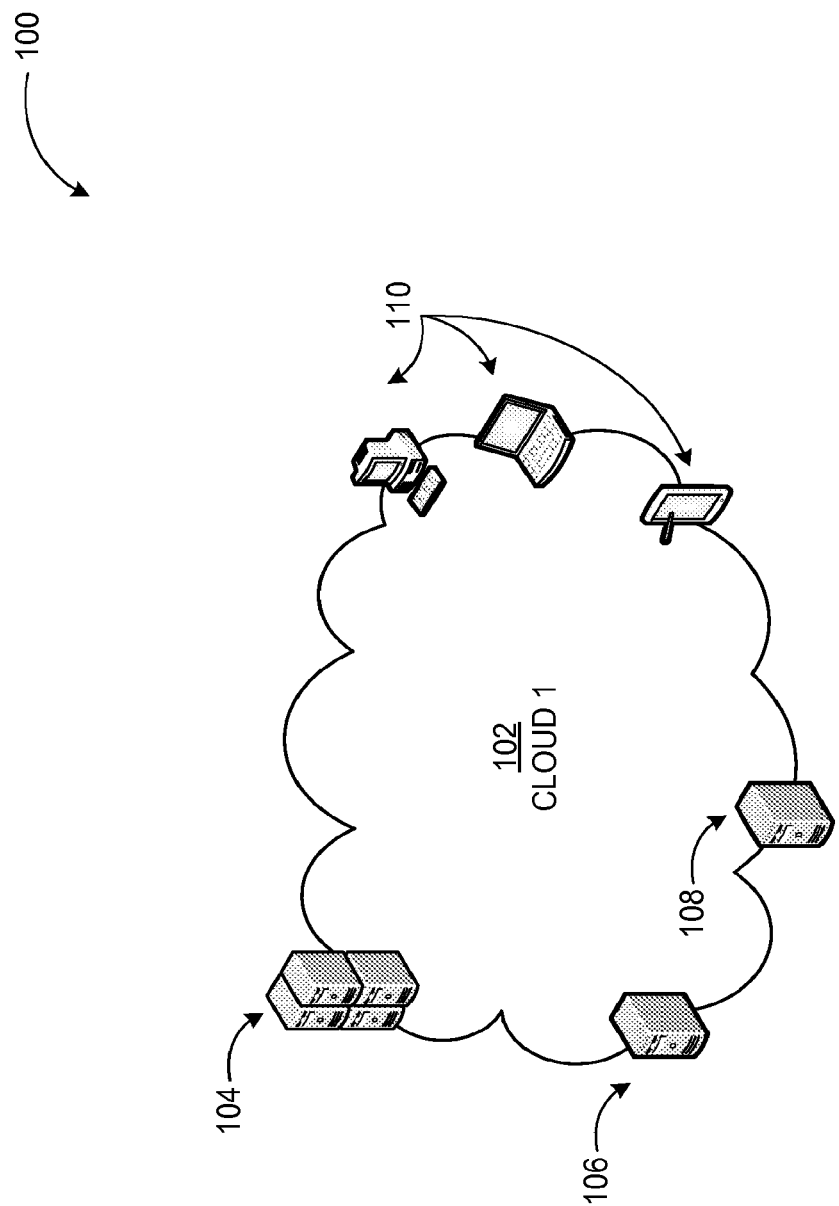
FIG. 1 illustrates an example system, where imaginary locations may be integrated into a physical world map for location-based applications.

In the following detailed description, reference is made to the accompanying drawings, which form a part hereof In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to enabling location-based applications to work with imaginary locations.

Briefly stated, technologies are provided for game providers to place their game worlds into existing map databases and communicate the relevant locations to location-based applications. This may be achieved by generating maps that use non-physical locations that are still within standard location data formats at a game service provider and providing the maps and/or map data to map server providers showing game worlds mapped to those coordinates. Alternatively, the game service provider may provide the map data to the map service provider and the map may be generated at the map service provider. The imaginary location maps may be identified by imaginary or non-real data such as, by way of example, extreme or non-physical altitudes, non-real location data, non-real map coordinates, etc. Game clients may be enabled to publish the location of their game persona on an imaginary map and/or their real persona on a real map and receive location-based services for either or both personas.

FIG. 1 illustrates an example system 100, where imaginary locations may be integrated into a physical world map for location-based applications arranged in accordance with at least some embodiments described herein.

Computer games often create imaginary worlds in which players can move around. Multiple players interacting over the Internet need to be able to exchange information about their positions in these imaginary worlds. Manipulating this information has similar challenges to that encountered with real position data, such as changing addresses into latitude and longitude. Example embodiments provide a way to leverage existing real location position services for imaginary game locations, without interference between the two. Notably, a client-side implementation view, a game provider view, and a map service provider view are provided for generating and utilizing imaginary location maps within an infrastructure of real world map usage. For example, the W3C standards provide guidelines and methods for delivering location data to applications. Location based and "check-in" type applications use such data, referenced against maps and geolocation databases, to record user locations and to apply names and significance to those locations. Similar techniques may be employed for imaginary locations and game personas in those locations.

As depicted in FIG. 1, the system 100 includes a map service server 104, a game service server 106, a location-based service server 108, and clients 110. For brevity, only one of each of the map service server 104, the game service server 106, and the location-based service server 108 are depicted in FIG. 1, although it should be understood that the system 100 may include more than one of each server. The servers and clients may be linked together via a cloud-based service 102, which may be implemented via a local/wide area network (LAN/WAN), a cellular network, the Internet, or any other suitable network.

The clients 110, which may include one or more desktop computers, laptops, vehicle-mounted computing devices, smartphones, tablets, or any other suitable computing device, may execute one or more location-based applications. These location-based applications may allow the clients 110 (or a user of one of the clients) to determine their location, obtain directions from one location to another location, search for nearby points of interest such as businesses, locations, or friends/people, register their presence at a particular location ("checking in"), or otherwise perform some action related to their current location. To perform these actions, the location-based applications may communicate with the map service server 104 and/or the location-based service server 108. The map service server 104 provides map data such as maps and geocoded points of information (e.g., roads, points of interest, labels, etc. that have associated positioning data, such as latitude, longitude, etc.) according to some coordinate set. The location-based service server 108, which may provide services related to social networking, retail, marketing, navigation, games, or any other suitable service, may retrieve the map data from the map service server 104 in response to a request from a location-based application and perform some action based on the retrieved map data, such as one of the actions described above.

In some embodiments, the clients 110 may execute an application that takes place in a virtual world (e.g., a game) associated with the game service server 106. In these embodiments, the game service server 106 may provide map data associated with the virtual world (e.g., an imaginary or non-physical world) to the map service server 104, and applications on the client 110 may be able to provide location-based services in the virtual world by having the location-based service server 108 retrieve and use the virtual world map data provided to the map service server 104. In some embodiments, even if clients 110 are stationary (e.g., desktop computers), a geolocation API may be provided so that the stationary clients can still use location-based services at imaginary locations in a virtual world.

Figure 2:
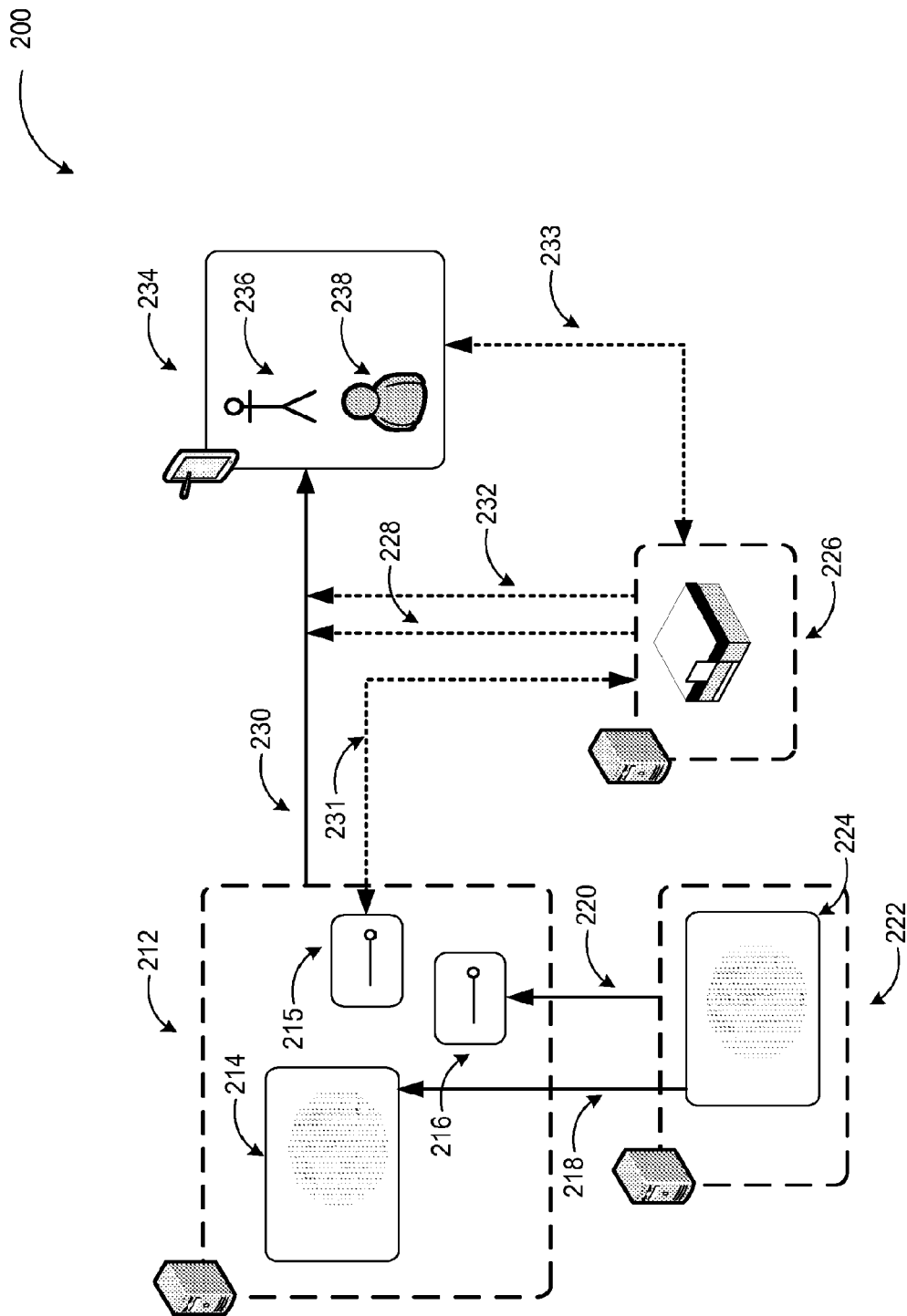
FIG. 2 illustrates interactions between components of a system for enabling location-based applications to work with imaginary locations.

FIG. 2 illustrates interactions between components of a system 200 for enabling location-based applications to work with imaginary locations arranged in accordance with at least some embodiments described herein. The system 200 includes a game provider 222, a map service provider 212, a location-based service provider 226, and a client 234. Similar to FIG. 1, for brevity, only one example of each of the game provider 222, the map service provider 212, the location-based service provider 226, and the client 234 are shown in FIG. 2, and it should be understood that the system 200 may include more than one of each the providers/clients.

A number of different interaction scenarios may occur in the system 200. For example, the game provider 222, which may operate the game service server 106 described above in relation to FIG. 1, may generate and maintain a map 224 including information about imaginary locations in a virtual world or game. To generate the map 224, the game provider 222 may use imaginary location map data including points of information about imaginary map locations/features, geocoded according to a non-physical coordinate set. To allow access to the virtual world location information, the game provider 222 may provide (218) the map 224 to the map service provider 212 (which may operate the map service server 104 described above in relation to FIG. 1). In another example scenario, the map service provider 212 may receive map data (220) from the game provider 222 via an API 216 and generate and maintain the imaginary map 214 as part of its map services that may include real world maps as well. In yet other examples, map data may be received from other map sources such as literary sources, cinematographic sources (movie publicity), historical reconstructions, and similar ones, through the API 216 or another API associated with the map service provider 212.

There may be a variety of scenarios in implementing the integration of location-based services with imaginary maps too. In some examples, the game provider 222 may provide metadata (location names, types, features, etc.) along with map data to the map service provider 212, which may be used by a location-based service provider 226 to provide location-based services such as naming of features and structures on the imaginary map, providing directions between points on the imaginary map, locating resources of particular type, connecting multiple game personas within vicinity of each other, suggesting nearby places, etc. Similarly, the map service provider 212 may also employ the metadata to provide additional services as well. In other examples, the location-based service provider 226 may interact with (231) the map service provider 212 via an API 215 and integrate its services into the map(s) provided by the map service provider using the metadata or integrate the map(s) into its services directly provided to the client 234. Thus, the client may receive the location-based services integrated into real world and imaginary maps provided (230) from the map service provider 212 or from maps integrated into services provided (233) by the location-based service provider 226 (e.g., an application, an applet, a service).

In some examples, a map source (e.g., map service provider, game provider, etc.) may charge a fee to location-based service providers, game players, map sources (e.g., a movie promoter), or others for adding metadata to the imaginary map such as place names, advertisement, and game-related functionality associated with particular places, etc. For example, the map service provider 212, the location-based service provider, and/or the game provider 222 may charge a fee to players for naming features or similar entities within the imaginary map enabling them to name a structure on the map for a subscription fee or similar arrangement.

In addition to the above provided examples, location-based services may include sending alerts, enabling services, creating geo-fencing applications, and/or building personalized experiences for game players on the imaginary map. The location-based service provider 226 may be a social networking application, a retail service application, a marketing application, a navigation application, a game application, or similar entity. Both APIs 215 and 216 may facilitate exchange of map data, metadata associated with the map, and input for services between the map service provider 212, location-based service providers, and map sources, respectively.

The client 234 (similar to the clients 110 described above in FIG. 1) may be associated with a real persona 236 and a game/virtual persona 238. For example, the real persona 236 may be the user of the client 234 (application and/or device), while the game/virtual persona 238 may be the virtual/in-game avatar of the real persona 236 (i.e., the client user) in the game provided by game provider 222. The client 234 may be used to access both real map data (not shown) provided by the map service provider 212 and virtual map data. Similarly, location-based service provider 226 may provide its services directed to the real persona 236 (dashed line 228) or directed to the virtual persona 238 (dashed line 232).

For example, the real persona 236 (i.e., the user) may use the client 234 to "check in" at a location in the real world (e.g., a restaurant or retail establishment). In this case, the client 234 may communicate with the location-based service provider 226 (which may use real map data from the map service provider 212) to determine the location of the real persona 236 in the real world, a corresponding real map location (e.g., the restaurant or retail establishment), and then perform the "check-in" function. Through the real persona 236, the user may meet other players of the game or receive other real world related services. The user may also use the client 234 to "check in" at an imaginary location in the virtual world of the game. In this case, the client 234 may also communicate with the location-based service provider 226 to perform the function. However, the location-based service provider 226 may use the virtual map data (the map 214 and/or the map the 224 via the API 216) instead of the real map data to identify the location of the virtual persona 238 in the virtual world and to perform the "check in" function.

While a "check in" functionality is described above, any other location-based service or functionality may be employed with a system according to some embodiments. As another example, the real persona 236 may request travel directions between two locations in the real world from the service provider 226 (or the map service provider 212), and the virtual persona 238 may request travel directions between two locations in the virtual world from the same service provider 226 (or the map service provider 212). Furthermore, real world-like services (retail, real estate, etc.) may be provided in conjunction with virtual locations in the imaginary world.

In some examples, the virtual persona 238 may even use a real-world location-based service, or the real persona 236 may use a virtual world location-based service. For example, the virtual persona 238 may "check in" to a real world location such as a restaurant. The location-based service provider 226, the map service provider 212, and/or the game provider 222 may distinguish between the virtual persona and the real persona in transitioning between real and imaginary locations, both in providing services (e.g., "checking in", searching nearby locations/friends, both virtual and real, and the like) and publishing information to social networking applications, as described above.

Figure 3:
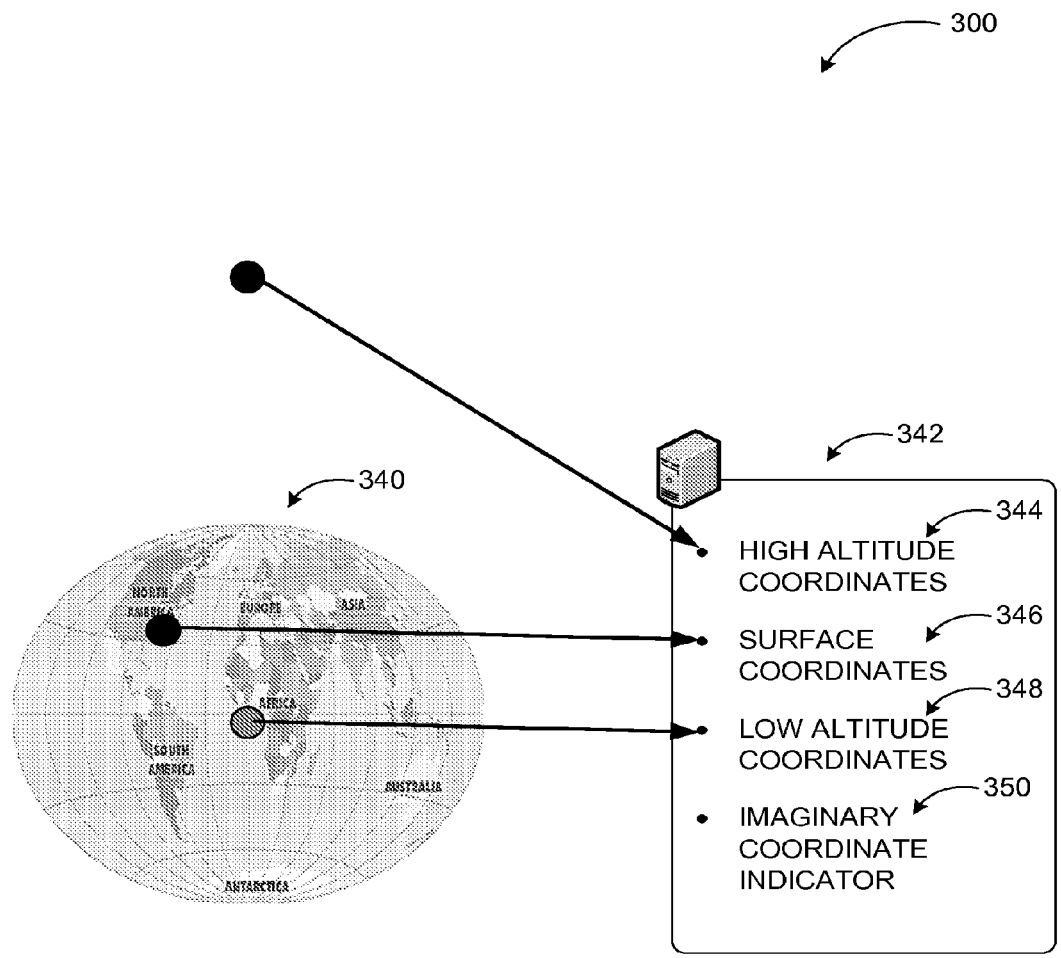
FIG. 3 illustrates conceptually different approaches for integrating imaginary locations into a physical world map.

FIG. 3 illustrates conceptually different approaches for integrating imaginary locations into a physical world map handling system arranged in accordance with at least some embodiments described herein. As shown in a diagram 300, virtual map data provided to a map service provider 342 may have imaginary map location/feature information geocoded according to a non-physical coordinate set. For example, in some embodiments, imaginary map locations may be geocoded with an imaginary coordinate indicator (350), such as a marker or a flag, to indicate that they are imaginary.

Real map locations may be geocoded such that they map directly upon existing map locations (e.g., with coordinates 346 located on the surface of Earth 340). On the other hand, imaginary map locations may be geocoded to not interfere with real map locations while maintaining a similar data format, for ease of interaction with real location-positioning services. One way imaginary map locations may be geocoded to avoid interference with real map locations yet remain compatible with location-positioning services may be to employ a different altitude. For example, a location data format suitable for geocoding may include latitude, longitude, altitude (optional), accuracy (latitude, longitude, and optionally altitude), heading (optional), and speed (optional). Real map locations tend to use all values of latitude and longitude, but only a portion of altitude values (e.g., up to 30,000 m or down to 500 m, etc.). Therefore, imaginary map locations may use some of the same latitude and longitude values as real map locations, but have values of altitudes significantly different from real map locations. For example, imaginary map locations may have altitude coordinates significantly higher than real map locations (344), corresponding to locations high in the atmosphere or even in space. Imaginary map locations may also employ altitude coordinates significantly lower than real map locations (348), corresponding to locations deep within the earth, or even corresponding to impossible depths (i.e., deeper than the center of the earth).

Given the earth is substantially round and the available surface grows in proportion to altitude, potentially much larger (but realistic) surfaces may be rendered available for imaginary maps. Furthermore, a system according to some example embodiments may assign different altitudes to distinct game service providers and/or games such that each game service provider/game has a distinct imaginary surface available for use in conjunction with map/location-based services. For example, portions of latitude and longitude at a particular altitude or plane, or latitude and longitude in certain altitude ranges or planes, may be made available to game providers or other service providers in conjunction with online games.

Additional functionality that may be provided through an imaginary map according to some embodiments may include providing directions, distance measurements, connecting multiple users within vicinity of each other, suggesting nearby places (commercial or non-commercial), sending alerts, enabling services, creating geo-fencing applications, and building personalized experiences for game players. Furthermore, styled maps, elevation view, street view, and similar visualizations of mapped locations may be provided. Base map layers of the imaginary map may be customized to fit the game provider's and/or location-based service provider's needs. The base map colors may be modified to match one or more brands, to draw attention to data, or to remove unwanted map features. Location-based service providers' images may be added (such as the inside of a building) for use in street view. In providing directions to the virtual persona suitable routing options for the virtual persona may be created, "drag and drop directions" may be implemented so that players can choose their own route directly on the imaginary map.

Figure 4:
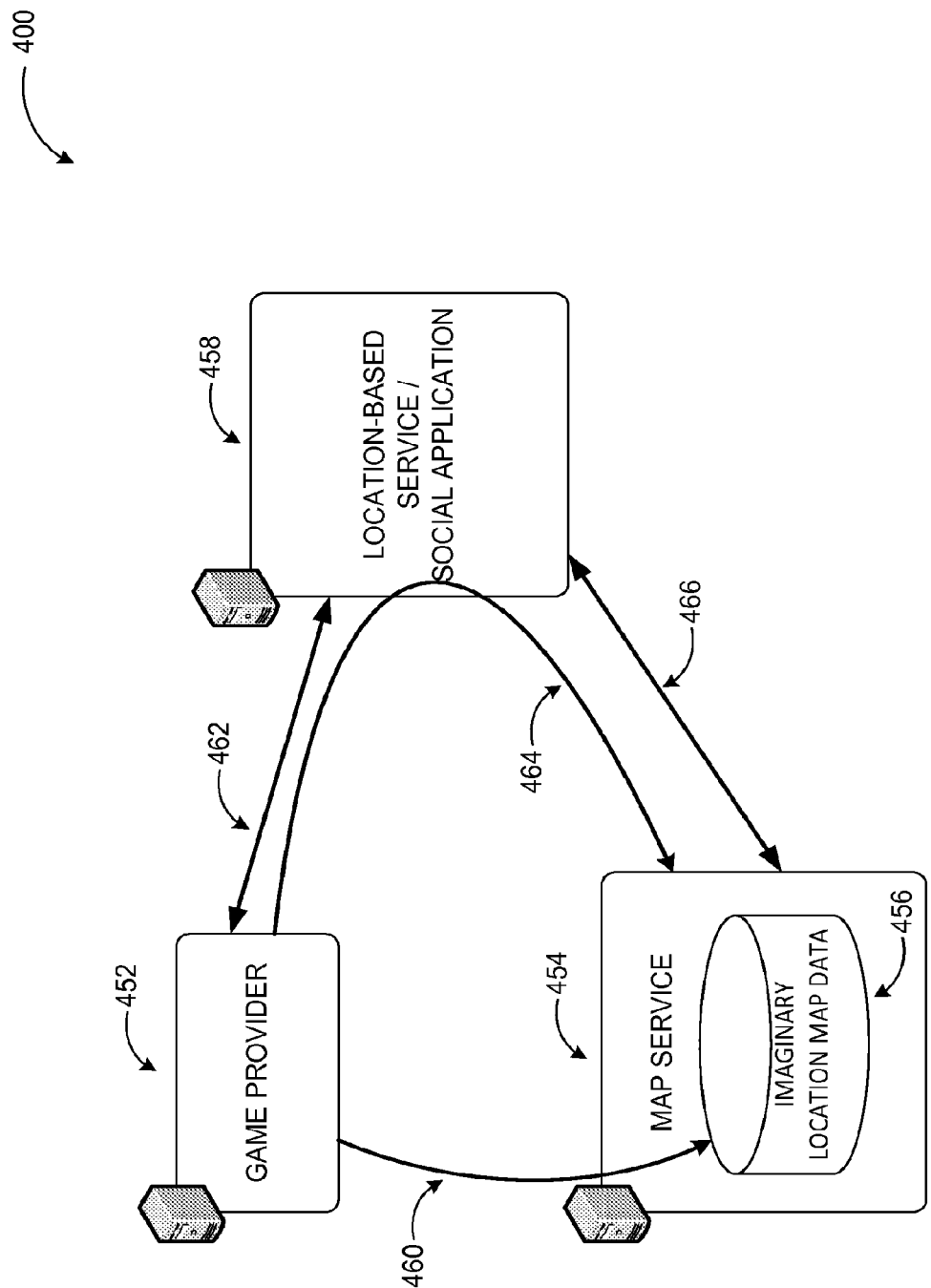
FIG. 4 illustrates an example architectural view of providing imaginary maps for location-based applications to use.

FIG. 4 illustrates an example architectural view of providing imaginary maps for location-based applications to use arranged in accordance with at least some embodiments described herein. As shown in a diagram 400, a game provider 452 may create imaginary location map data 456 (arranged around a non-physical coordinate set) by rendering an overall map in a scale-and-geolocation-matched format, with non-physical locations geocoded. For example, the imaginary location map data 456 may include a large corpus of data arranged in neighboring tiles with multiple resolutions, such as images and geocoded points of information like imaginary roads, points of interest, and labels.

The game provider 452 may provide (460) the imaginary location map data 456 along with metadata to a map service provider 454. Non-physical coordinates corresponding to an imaginary location can also be supplied (464) to a location-based service/social application 458 directly from the game provider 452 for fetching maps and metadata about the mapped imaginary world and forwarded to the map service provider 454. The map service provider 454 may provide maps, highlights, directions, etc. for the non-physical locations to the location-based service/social application 458 as if they were real world locations.

The location-based services (e.g., finding friends, locations of interest, notifications, travel directions, or any other suitable service) may still be used transparently through existing location-based applications. The location-based service/social application 458 may cache neighboring tiles, compute user distances for friend finding, and perform other location-based actions using existing code and routines originally intended for real-world location-based services. A location-based service request may be initiated by (462) the game provider 452 and/or by (466) the location-based service/social application 458. As discussed previously, the location-based service/social application 458 may interact with the map service provider 454 through one or more APIs and provide services on imaginary maps provided by the map service provider 454 using metadata provided by the imaginary map source (e.g., the game provider 452) or receive map data and provide its services with integrated map information directly to game clients.

Figure 5:
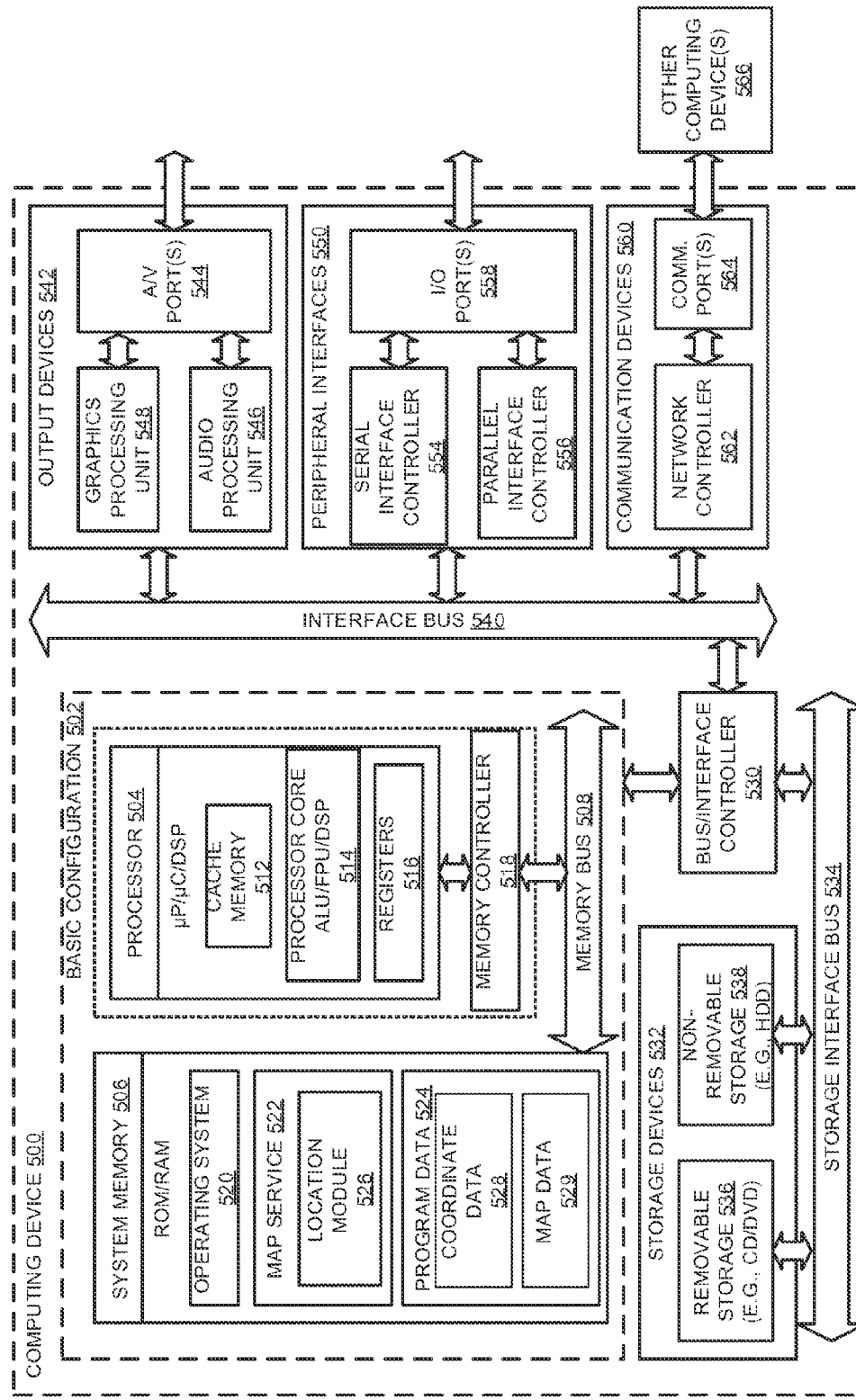
FIG. 5 illustrates a general purpose computing device, which may be used to implement enabling location-based applications to work with imaginary locations.

FIG. 5 illustrates a general purpose computing device 500, which may be used to enable location-based applications to work with imaginary locations in accordance with at least some embodiments described herein. In a very basic configuration 502, the computing device 500 may be a server at a map service provider or at a game service provider, and typically includes one or more processors 504 and a system memory 506. A memory bus 508 may be used for communicating between the processor 504 and the system memory 506.

Depending on the desired configuration, the processor 504 may be of any type, including but not limited to a microprocessor ($\mu$P), a microcontroller ($\mu$C), a digital signal processor (DSP), or any combination thereof The processor 504 may include one more levels of caching, such as a level cache memory 512, a processor core 514, and registers 516. The example processor core 514 may include an arithmetic logic unit (ALU), a floating point unit (FPU), a digital signal processing core (DSP Core), or any combination thereof An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof The system memory 506 may include an operating system 520, one or more map service applications 522, and program data 524. The map service applications 522 may include a location module 526 that is arranged to provide location-based services for real or imaginary locations or any other processes, methods, and functions as described above. The program data 524 may include coordinate data 528 (e.g., coordinates for physical and/or non-physical locations, etc.), map data 529 (e.g., points of interest, roads, labels, or any other suitable data associated with a map of real or imaginary locations), and similar data as discussed herein in conjunction with the figures. In some embodiments, the map service application 522 may be arranged to operate with the program data 524 on the operating system 520 in order to perform location-based services for real or imaginary locations as described herein. This described basic configuration 502 is illustrated in FIG. 5 by those components within the inner dashed line.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (e.g., one or more output devices 542, one or more peripheral interfaces 550, and one or more communication devices 566) to the basic configuration 502 via the bus/interface controller 530. Some of the example output devices 542 include a graphics processing unit 548 and an audio processing unit 546, which may be configured to communicate to various external devices such as a display or speakers via one or more A/V ports 544. One or more example peripheral interfaces 550 may include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 560 includes a network controller 562, which may be arranged to facilitate communications with one or more other computing devices 566 over a network communication link via one or more communication ports 564. The one or more other computing devices 566 may include servers at a datacenter, customer equipment, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a portion of a physical server, virtual server, a computing cloud, or a hybrid device that include any of the above functions. The computing device 500 may also be implemented as a personal computer including both laptop computer and non-laptop computer configurations. Moreover, the computing device 500 may be implemented as a networked system or as part of a general purpose or specialized server.

Networks for a networked system including computing device 500 may comprise any topology of servers, clients, switches, routers, modems, Internet service providers, and any appropriate communication media (e.g., wired or wireless communications). A system according to embodiments may have a static or dynamic network topology. The networks may include a secure network such as an enterprise network (e.g., a LAN, WAN, or WLAN), an unsecure network such as a wireless open network (e.g., IEEE 802.11 wireless networks), or a world-wide network (e.g., the Internet). The networks may also comprise multiple distinct networks that are adapted to operate together. Such networks are configured to provide communication between the nodes described herein. By way of example, and not limitation, these networks may include wireless media such as acoustic, RF, infrared and other wireless media. Furthermore, the networks may be portions of the same network or separate networks.

Example embodiments may also include methods. These methods can be implemented in any number of ways, including the structures described herein. One such way is by machine operations, of devices of the type described in the present disclosure. Another optional way is for one or more of the individual operations of the methods to be performed in conjunction with one or more human operators performing some of the operations while other operations are performed by machines. These human operators need not be collocated with each other, but each can be only with a machine that performs a portion of the program. In other examples, the human interaction can be automated such as by pre-selected criteria that are machine automated.

Figure 6:
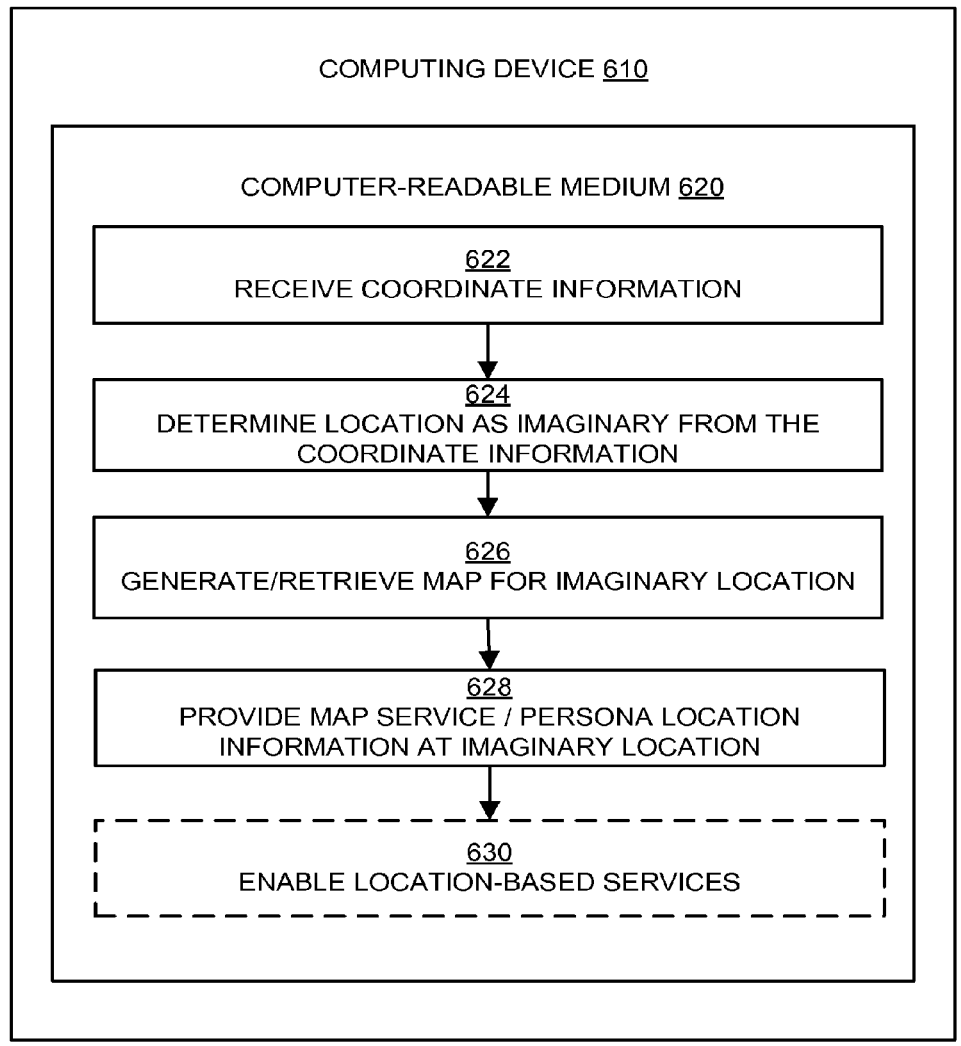
FIG. 6 is a flow diagram illustrating an example method that may be performed by a computing device such as the computing device of FIG. 5.

FIG. 6 is a flow diagram illustrating an example method that may be performed by a computing device such as the computing device 500 in FIG. 5 in accordance with at least some embodiments described herein. Thus, a controller device 610 may be embodied as the computing device 500 or similar devices executing instructions stored in a computer-readable medium 620 for performing the method. A process of providing location-based services associated with imaginary locations may include one or more operations, functions or actions as is illustrated by blocks 622, 624, 626, 628, and/or 630.

Some examples processes may begin with block 622, "RECEIVE COORDINATE INFORMATION". At block 622, coordinate information may be received, for example by a location-based service or social networking application (e.g., the location-based service 108 in FIG. 1 or location-based service/social application 458 in FIG. 4) or by a map service (e.g., the map service server 104 in FIG. 1, the map service 212 in FIG. 2, or the map service 454 in FIG. 4).

Block 622 may be followed by block 624, "DETERMINE LOCATION AS IMAGINARY FROM THE COORDINATE INFORMATION". This may be accomplished by determining whether the received coordinate information includes an imaginary location indicator (e.g., the indicator 350 in FIG. 3) and/or whether altitude data in the received coordinate information exceeds or falls below one or more predefined thresholds. The determination in block 624 may be performed by, for example, the computing device 500 in FIG. 5.

When the determination is made that the received coordinate information corresponds to an imaginary location, block 626, "GENERATE/RETRIEVE MAP FOR IMAGINARY LOCATION" may be performed, by a location-based service or a map service via, e.g., the computing device 500 in FIG. 5. At block 626, a map or map data for the imaginary location may be generated or retrieved. A location-based service performing this operation may retrieve the map/map data from a map service or generate the map based on data from the map service, as described above in relation to FIG. 2 and FIG. 4, and a map service performing this operation may generate the map based on map data received from a game provider (e.g. the game service server 106 in FIG. 1 or the game provider 452 in FIG. 4).

Block 626 may be followed by block 628, "PROVIDE MAP SERVICE/PERSONA LOCATION INFORMATION AT IMAGINARY LOCATION", which may be performed by a map service or a location-based service such as the map service server 104 or the location-based service server 108 in FIG. 4). In block 626, a map service and/or location-based service may provide services associated with a real or virtual persona and the imaginary location such as providing a map of the imaginary surroundings of the persona, enabling searching of the imaginary location map through geocoding, providing multiple views of the imaginary location (e.g., terrain view, road view, etc.), publishing the location/presence of the persona, or any other suitable service.

Block 628 may be followed by optional block 630, "ENABLE LOCATION-BASED SERVICES". This may be performed by a location-based service such as the location-based service server 108 on FIG. 1 using metadata associated with the map. Location-based services that may be enabled include map searching, providing purchase interface(s) for services related to one or more places at the imaginary location (e.g., virtual stores selling real or virtual merchandise or services, having the imaginary location appear in a map search, etc.), searching for nearby friends or points of interest, or any other suitable service.

The operations included in the process of FIG. 6 described above are for illustration purposes. Providing location-based services associated with imaginary locations may be implemented by similar processes with fewer or additional operations. In some examples, the operations may be performed in a different order. In some other examples, various operations may be eliminated. In still other examples, various operations may be divided into additional operations, or combined together into fewer operations. Although illustrated as sequentially ordered operations, in some implementations the various operations may be performed in a different order, or in some cases various operations may be performed at substantially the same time.

Figure 7:
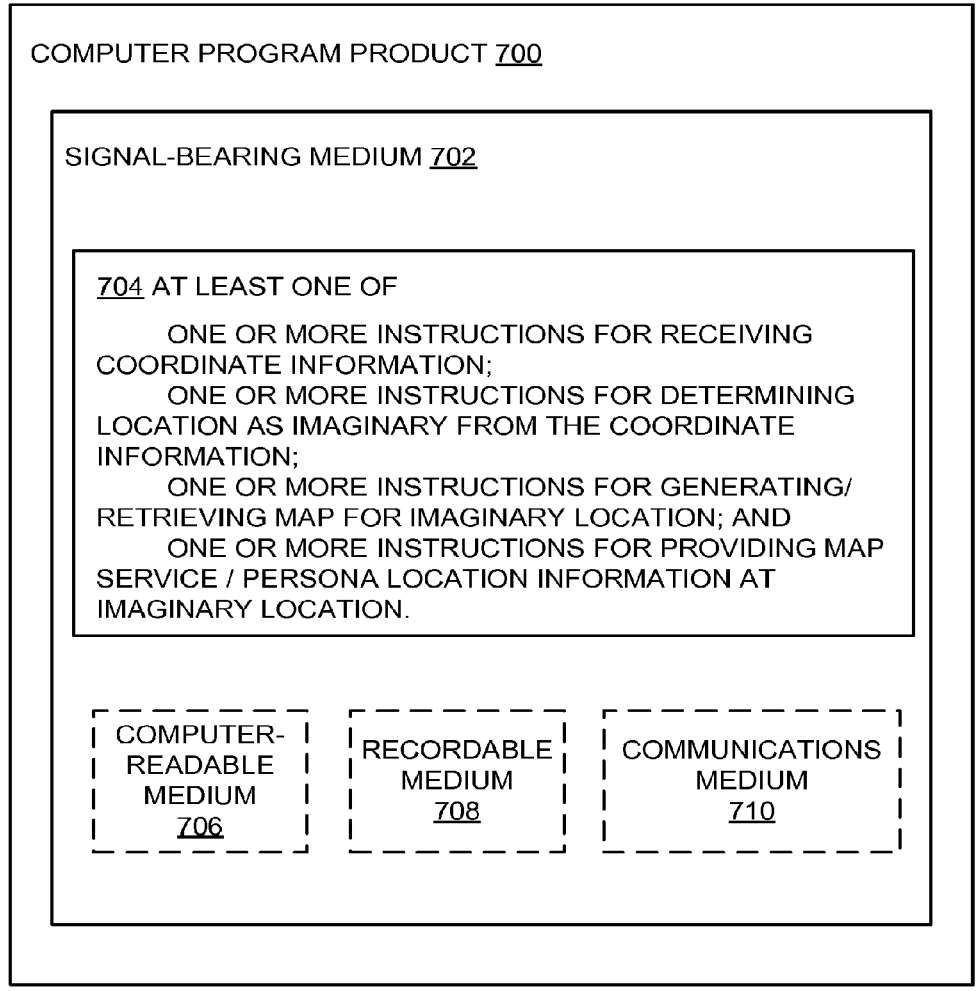
FIG. 7 illustrates a block diagram of an example computer program product, all arranged in accordance with at least some embodiments described herein.

FIG. 7 illustrates a block diagram of an example computer program product 700, arranged in accordance with at least some embodiments described herein. In some examples, as shown in FIG. 7, the computer program product 700 may include a signal bearing medium 702 that may also include machine readable instructions 704 that, when executed by, for example, a processor, may provide the functionality described above with respect to FIGS. 1-4 and FIG. 6. Thus, for example, referring to the computing device 500, one or more of the tasks shown in FIG. 6 may be undertaken in response to the instructions 704 conveyed to the processor 504 by the medium 702 to perform actions associated with location-based services and imaginary locations as described herein. Some of those instructions may include receiving coordinate information, determining whether a particular location is imaginary based on the coordinate information, generating or retrieving a map for the imaginary location, and providing a map service, persona location information, and/or any other location-based service at the imaginary location as described previously.

In some implementations, the signal bearing medium 702 depicted in FIG. 7 may encompass a computer-readable medium 706, such as, but not limited to, a hard disk drive, a solid state drive, a Compact Disc (CD), a Digital Versatile Disk (DVD), a digital tape, memory, etc. In some implementations, the signal bearing medium 702 may encompass a recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, the program product 700 may be conveyed to one or more modules of the processor 504 by an RF signal bearing medium, where the signal bearing medium 702 is conveyed by the wireless communications medium 710 (e.g., a wireless communications medium conforming with the IEEE 802.11 standard).

In some examples, the present disclosure describes a method for providing a map service that enables location-based applications to work with imaginary locations. An example method may include receiving map data including coordinate information, determining the map data as belonging to an imaginary location based on the coordinate information, generating a map based on the map data, and providing the map for the imaginary location through the map service.

According to some examples, the method may also include enabling location-based services to be provided for the imaginary location. The location-based services may be provided by a social networking application, a retail service application, a marketing application, a navigation application, or a game application, and the location-based services may include providing directions, connecting multiple game personas within vicinity of each other, suggesting nearby places, sending alerts, enabling services, creating geo-fencing applications, and/or building personalized experiences for game players. The method may further include providing personal location information for one or more game persona at the imaginary location, distinguishing between the game persona and real persona in transitioning between real locations and imaginary locations, and/or distinguishing between the game persona and real persona in publishing of game persona to a social networking application. A game provider or a map service provider may be enabled to charge a fee to one or more location-based service providers for adding metadata to the map, where the metadata includes a place name, an advertisement, and/or a game-related functionality associated with the imaginary location.

According to other examples, the method may include determining the map data as belonging to the imaginary location based on an imaginary location indicator associated with the map data and/or determining the map data as belonging to the imaginary location based on an altitude associated with the map data. The altitude associated with the map data may be higher than a predefined threshold or lower than another predefined threshold. The method may further include providing a purchase interface for one or more places at the imaginary location. The map for the imaginary location may include images, geocoded points of information, and/or labels. The method may include providing an imaginary location plane for game providers, where a distinct identifier is provided to each game provider for delivering imaginary location map data to a map service provider. According to some examples, the method may further include enabling map search through geocoding and/or providing multiple views of the imaginary location through the map service.

In other examples, a map service provider enabling location-based applications to work with imaginary locations is described. The map service provider may include one or more servers configured to receive map data from a game provider including coordinate information, determine the map data as belonging to an imaginary location based on the coordinate information, generate a map based on the map data, and provide the map for the imaginary location through a map service.

According to some examples, the server may also be configured to enable location-based services to be provided for the imaginary location. The location-based services may be provided by a social networking application, a retail service application, a marketing application, a navigation application, or a game application, and the location-based services may include providing directions, connecting multiple game personas within vicinity of each other, suggesting nearby places, sending alerts, enabling services, creating geo-fencing applications, and/or building personalized experiences for game players. The server may be further configured to provide personal location information for one or more game persona at the imaginary location, distinguish between the game persona and real persona in transitioning between real locations and imaginary locations, and/or distinguish between the game persona and real persona in publishing of game persona to a social networking application.

According to other examples, the server may be configured to determine the map data as belonging to the imaginary location based on an imaginary location indicator associated with the map data and/or determine the map data as belonging to the imaginary location based on an altitude associated with the map data. The altitude associated with the map data may be higher than a predefined threshold or lower than another predefined threshold. The server may further be configured to provide a purchase interface for one or more places at the imaginary location. The map for the imaginary location may include images, geocoded points of information, and/or labels. The server may be configured to provide an imaginary location plane for game providers, where a distinct identifier is provided to each game provider for delivering imaginary location map data to a map service provider. According to some examples, the server may further be configured to enable map search through geocoding and/or provide multiple views of the imaginary location through the map service.

In further examples, a method for enabling location-based applications to work with imaginary locations associated with a game is described. The method may include generating map data for an imaginary location including coordinate information, indicating the map data as belonging to the imaginary location, and providing the map data to a map service to generate a map for the imaginary location based on the map data.

According to some examples, the method may also include enabling location-based services to be provided for the imaginary location. The location-based services may be provided by a social networking application, a retail service application, a marketing application, a navigation application, or a game application, and the location-based services may include providing directions, connecting multiple game personas within vicinity of each other, suggesting nearby places, sending alerts, enabling services, creating geo-fencing applications, and/or building personalized experiences for game players. The method may further include enabling publication of personal location information for one or more game persona at the imaginary location and/or distinguishing between the game persona and real persona in transitioning between real locations and imaginary locations. The method may further include enabling location-based services to be provided for the imaginary location through an application programming interface (API) of the map service.

According to other examples, the method may include indicating the map data as belonging to the imaginary location based on an imaginary location indicator associated with the map data and/or based on an altitude associated with the map data. The altitude associated with the map data may be higher than a predefined threshold or lower than another predefined threshold. The method may further include providing a purchase interface for one or more places at the imaginary location, providing images, geocoded points of information, and/or labels for the imaginary location, and/or enabling publication of multiple views of the imaginary location through the map service.

In other examples, a game provider service enabling location-based applications to work with imaginary locations associated with a game is described. The game provider service may include one or more servers configured to generate map data for an imaginary location including coordinate information, indicate the map data as belonging to the imaginary location, and provide the map data to a map service to generate a map for the imaginary location based on the map data.

According to some examples, the server is further configured to enable location-based services to be provided for the imaginary location, where the location-based services include providing directions, connecting multiple game personas within vicinity of each other, suggesting nearby places, sending alerts, enabling services, creating geo-fencing applications, and/or building personalized experiences for game players. The location-based services may be provided by a social networking application, a retail service application, a marketing application, a navigation application, and/or a game application. The server may be further configured to enable publication of personal location information for one or more game personas at the imaginary location and/or distinguishing between the game persona and real persona in transitioning between real locations and imaginary locations.

According to other examples, the server may be further configured to indicate the map data as belonging to the imaginary location based on an imaginary location indicator associated with the map data and/or an altitude associated with the map data. The altitude associated with the map data may be higher than a predefined threshold or lower than another predefined threshold. In some examples, the server may be configured to provide a purchase interface for one or more places at the imaginary location and/or provide images, geocoded points of information, and/or labels for the imaginary location. According to some examples, the server may be further configured to enable publication of multiple views of the imaginary location through the map service.

In yet other examples, a method for participating in an online game with location-based applications enabled to work with imaginary locations associated with the game is described. The method may include joining the game using a game persona, enabling publication of game persona location within an imaginary map of the game, and receiving one or more location-based services based on the game persona location on the imaginary game map.

According to some examples, the location-based services may be provided by a social networking application, a retail service application, a marketing application, a navigation application, or a game application, and the location-based services may include providing directions, connecting multiple game personas within vicinity of each other, suggesting nearby places, sending alerts, enabling services, creating geo-fencing applications, and/or building personalized experiences for game players. The method may further include enabling publication of real persona location information along with the game persona location and/or indicating the game persona location as an imaginary location based on an imaginary location indicator, a higher than a predefined threshold altitude, and/or a lower than another predefined threshold altitude. The imaginary game map may include a purchase interface for one or more services associated with specific locations on the imaginary game map and/or images, geocoded points of information, and/or labels for the imaginary location. The game persona location may be published through a manual action and/or an automatic game client application action.

In further examples, a computing device executing a game client for participating in an online game with location-based applications enabled to work with imaginary locations associated with the game is described. The computing device may include a memory configured to store instructions and a processor configured to execute the game client in conjunction with the instructions stored in the memory. The game client may be configured to join the game using a game persona, enable publication of game persona location within an imaginary map of the game, and receive one or more location-based services based on the game persona location on the imaginary game map.

According to some examples, the location-based services may include a social networking application, a retail service application, a marketing application, a navigation application, and/or a game application. The game client may be further configured to enable publication of real persona location information along with the game persona location and/or indicate the game persona location as an imaginary location based on an imaginary location indicator, a higher than a predefined threshold altitude, and/or a lower than another predefined threshold altitude. The imaginary game map may include a purchase interface for one or more services associated with specific locations on the imaginary game map and/or images, geocoded points of information, and/or labels for the imaginary location. The game persona location may be published through a manual action and/or an automatic game client application action. In some examples, the computing device is a desktop computer, a laptop computer, a handheld computer, a vehicle mount computer, a terminal, a smart phone, and/or a gaming device.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, systems, or components, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops.

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to provide a map service that enables a location-based application to work with imaginary locations, the method comprising:
   receiving map data that includes a first coordinate information associated with the imaginary locations;
   comparing the first coordinate information associated with the imaginary locations to a second coordinate information associated with real locations of one or more virtual persona of an in-game avatar of a real persona received from a real-world location based service, wherein the first coordinate information differs from the second coordinate information;
   enabling the first coordinate information to be geocoded in accordance with a non-physical data set used to determine the imaginary locations, wherein the non-physical data includes one or more of an extreme altitude, a non-physical altitude, a non-real location data, and a non-real map coordinate;
   enabling the second coordinate information to be geocoded in accordance with existing coordinate information of the real locations on a surface of Earth based on a "check in" of the one or more virtual persona at the real locations;
   determining the map data as belonging to the imaginary locations based on the comparison;
   generating a map based on the map data;
   providing the map for the imaginary locations through a map service provider to the location-based application; and enabling the location-based application to display the map for the imaginary locations on a graphical user interface of the location-based application.

2. The method according to claim 1, further comprising:
enabling location-based services to be provided for the imaginary locations through metadata associated with the map.

3. The method according to claim 2, wherein the location-based services are provided by one or more of a social networking application, a retail service application, a marketing application, a navigation application, and a game application, and wherein the location-based services include one or more of providing directions, connecting multiple game persona within vicinity of each other, suggesting nearby places, sending alerts, enabling services, creating geo-fencing applications, and building personalized experiences for game players.

4. The method according to claim 1, further comprising:
providing personal location information for one or more virtual persona at the imaginary locations.

5. The method according to claim 4, further comprising:
distinguishing between the one or more virtual persona and the real persona in transitioning between the real locations and the imaginary locations; and
distinguishing between the one or more virtual persona and the real persona in publishing of the one or more virtual persona to a social networking application.

6. The method according to claim 1, further comprising:
enabling one of a game provider and the map service provider to charge a fee to one or more of a location-based service provider and a game player for adding metadata to the map, wherein the metadata includes one or more of a place name, an advertisement, and a game-related functionality associated with the imaginary locations.

7. The method according to claim 1, further comprising:
determining the map data as belonging to the imaginary locations based on an imaginary location indicator associated with the map data.

8. A map service provider that enables a location-based application to work with imaginary locations, the map service provider comprising:
at least one server configured to:
receive map data from a game provider that includes a first coordinate information associated with the imaginary locations;
compare the first coordinate information associated with the imaginary locations to a second coordinate information associated with real locations of one or more virtual persona of an in-game avatar of a real persona, wherein the first coordinate information differs from the second coordinate information;
geocode the first coordinate information in accordance with a non-physical data set used to determine the imaginary locations, wherein the non-physical data includes one or more of an extreme altitude, a non-physical altitude, a non-real location data, and a non-real map coordinate;
geocode the second coordinate information in accordance with existing coordinate information of the real locations on a surface of Earth based on a "check in" of the one or more virtual persona at the real locations;
determine the map data as belonging to the imaginary locations based on the comparison;
generate a map based on the map data;
provide the map for the imaginary locations through a map service provider to the location-based application; and
enable the location-based application to display the map for the imaginary locations on a graphical user interface of the location-based application.

9. The map service provider according to claim 8, wherein the at least one server is further configured to:
determine the map data as belonging to the imaginary locations based on an imaginary location indicator associated with the map data.

10. The map service provider according to claim 8, wherein the at least one server is further configured to:
determine the map data as belonging to the imaginary locations based on an altitude associated with the map data.

11. The map service provider according to claim 10, wherein the altitude is one of higher than a predefined threshold and lower than another predefined threshold.

12. The map service provider according to claim 8, wherein the at least one server is further configured to:
provide a purchase interface for one or more places at the imaginary locations.

13. The map service provider according to claim 8, wherein the map for the imaginary locations includes one or more of images, geocoded points of information, and labels.

14. A method to enable a location-based application to work with imaginary locations associated with a game, the method comprising:
generating map data that includes a first coordinate information associated with the imaginary locations and a second coordinate information associated with real locations of one or more virtual persona of an in-game avatar of a real persona, wherein the first coordinate information differs from the second coordinate information;
enabling the first coordinate information to be geocoded in accordance with a non-physical data set used to determine the imaginary locations, wherein the non-physical data includes one or more of an extreme altitude, a non-physical altitude, a non-real location data, and a non-real map coordinate;
enabling the second coordinate information associated with real locations of the one or more virtual persona to be geocoded in accordance with existing coordinate information of the real locations on a surface of Earth based on a "check in" of the one or more virtual persona at the real locations;
indicating the map data as belonging to the imaginary locations based on an altitude associated with the map data, wherein the altitude is one of higher than a predefined threshold and lower than another predefined threshold;
providing the map data to a map service provider to generate a map for the imaginary locations based on the map data; and
enabling the location-based application to display the map for the imaginary locations on a graphical user interface of the location-based application.

15. The method according to claim 14, further comprising:
enabling location-based services to be provided for the imaginary locations through an application programming interface (API) of the map service, wherein the location-based services include one or more of providing directions, connecting multiple game personas within vicinity of each other, suggesting nearby places, sending alerts, enabling services, creating geo-fencing applications, and building personalized experiences for game players.

16. The method according to claim 15, wherein the location-based services are provided by one or more of a social networking application, a retail service application, a marketing application, a navigation application, and a game application.

17. The method according to claim 14, further comprising:
enabling publication of personal location information for the one or more virtual persona at the imaginary locations; and
distinguishing between the one or more virtual persona and the real persona in transitioning between the real locations and the imaginary locations.

18. A game provider service that enables a location-based application to work with imaginary locations associated with a game, the game provider service comprising:
at least one server configured to:
generate map data that includes a first coordinate information associated with the imaginary locations and a second coordinate information associated with real locations of one or more virtual persona of an in-game avatar of a real persona, wherein the first coordinate information differs from the second coordinate information;
geocode the first coordinate information in accordance with a non-physical data set used to determine the imaginary locations, wherein the non-physical data includes one or more of an extreme altitude, a non-physical altitude, a non-real location data, and a non-real map coordinate;
geocode the second coordinate information associated with real locations of the one or more virtual persona in accordance with existing coordinate information of the real locations on a surface of Earth based on a "check in" of the one or more virtual persona at the real locations,
indicate the map data as belonging to the imaginary locations based on an altitude associated with the map data, wherein the altitude is one of higher than a predefined threshold and lower than another predefined threshold;
provide the map data to a map service to generate a map for the imaginary locations based on the map data; and
enable the location-based application to display the map for the imaginary locations on a graphical user interface of the location-based application.

19. The game provider service according to claim 18, wherein the at least one server is further configured to:
provide a purchase interface for one or more places at the imaginary locations; and
provide one or more of images, geocoded points of information, and labels for the imaginary locations.

20. The game provider service according to claim 18, wherein the at least one server is further configured to:
enable publication of multiple views of the imaginary locations through the map service.

* * * * *

UNITED STATES PATENT AND TRADEMARK OFFICE
CERTIFICATE OF CORRECTION

PATENT NO. : 9,077,771 B2
APPLICATION NO. : 13/640046
DATED : July 7, 2015
INVENTOR(S) : Kruglick It is certified that error appears in the above-identified patent and that said Letters Patent is hereby corrected as shown below:

In the specification

Column 1, Line 1,
insert -- CROSS-REFERENCE TO RELATED APPLICATION
This Application is the National Stage filing under 35 U.S.C. § 371 of PCT Application Ser. No. PCT/US12/31304 filed on March 29, 2012. The disclosure of the PCT Application is hereby incorporated by reference in its entirety. --.

Column 1, Lines 7-10,
delete "This Application is the National Stage filing under 35 U.S.C. § 371 of PCT Application Ser. No. PCT/US12/31304 filed on March 29, 2012. The disclosure of the PCT Application is hereby incorporated by reference in its entirety." and
insert -- Unless otherwise indicated herein, the materials described in this section are not prior art to the claims in this application and are not admitted to be prior art by inclusion in this section. --, therefor.

Column 8, Line 25, delete "thereof The" and insert -- thereof. The --, therefor.

Column 8, Line 30, delete "thereof An" and insert -- thereof. An --, therefor.

Column 8, Line 37, delete "thereof The" and insert -- thereof. The --, therefor.

Column 8, Line 64, delete "thereof Examples" and insert -- thereof. Examples --, therefor.

Column 15, Line 66, delete "thereof In" and insert -- thereof. In --, therefor.

Signed and Sealed this
Twenty-second Day of December, 2015

Michelle K. Lee
*Director of the United States Patent and Trademark Office*